July 30, 1968 G. FLEISSNER 3,394,470
SIEVE DRUMS WITH ECCENTRIC POSITIONING OF FAN MEANS
Filed July 20, 1966 2 Sheets-Sheet 1

*Inventor:*
GEROLD FLEISSNER
BY Dicke + Craig
ATTORNEYS

July 30, 1968  G. FLEISSNER  3,394,470
SIEVE DRUMS WITH ECCENTRIC POSITIONING OF FAN MEANS
Filed July 20, 1966  2 Sheets-Sheet 2
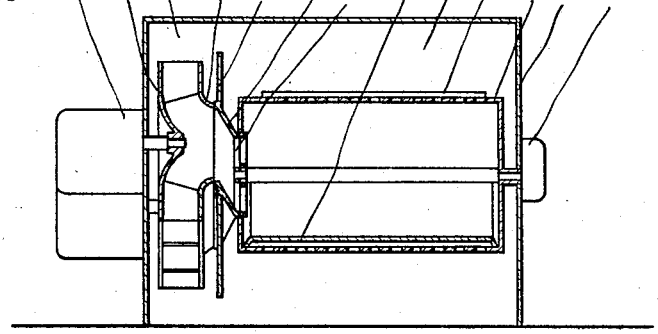
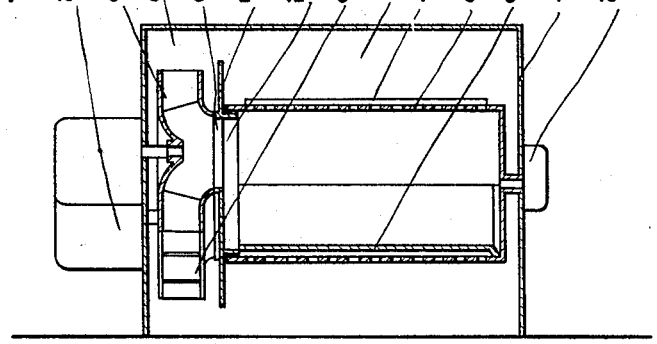
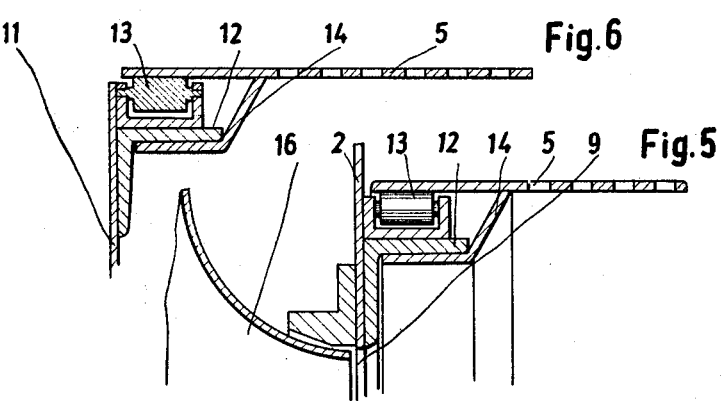
Inventor:
GEROLD FLEISSNER
BY Dicke + Craig
ATTORNEYS

United States Patent Office 3,394,470
Patented July 30, 1968

3,394,470
SIEVE DRUMS WITH ECCENTRIC POSITIONING OF FAN MEANS
Gerold Fleissner, Egelsbach, near Frankfurt am Main, Germany, assignor to Vepa AG, Basel, Switzerland
Filed July 20, 1966, Ser. No. 566,501
Claims priority, application Germany, July 23, 1965, A 49,820
20 Claims. (Cl. 34—115)

ABSTRACT OF THE DISCLOSURE

A device for the treatment of textile material by means of sieve drums subjected to a suction draft and arranged closely side by side as conveying elements. Radial fan wheel means are arranged eccentrically at least on one end face of the drums, thus permitting the use of larger capacity fans.

---

The present invention relates to a device for the treatment, for example, for drying, steaming, setting, washing and the like, of materials of all kinds, preferably of textile material by means of sieve drums subjected to a suction draft and arranged closely side by side as conveying elements and by means of fan wheels, preferably radial fan wheels which are arranged at least on one end face of those sieve drums.

Devices with sieve drums subjected to a suction draft are known in which the sieve drums are arranged closely side by side in order to enable automatic material passage from one sieve drum to the next following one. The material to be treated is held onto the sieve drums by means of the suction draft. At the point of passage preferably a baffle plate is arranged in the sieve drum which baffle plate interrupts the suction draft in those areas and enables detachment of the material from the sieve drum. For heavy materials and in order to obtain as intensive as possible a treatment effect and in order to reduce the treatment time, most powerful suction drafts in the sieve drums are desirable. To obtain good flow conditions, the fan wheels are arranged as close to the sieve drum faces as possible. Powerful suction drafts require large fan wheels. In the known devices in which the fan wheels are arranged concentrically to the sieve drums, the fan wheel diameter is limited by the sieve drum diameter. In the case of the latter devices, the fan wheel diameter may by no means be larger than the sieve drum diameter. On the contrary, the fan must be designed slightly smaller than the sieve drum in order to ensure a minimum distance between the individual fan wheels, in which distances, for example, guide sheets for a better guidance of the air discharged by the fan wheels may be provided. These guide sheets, however, are not absolutely necessary, they may also be dispensed with. If the fan wheels are arranged at a certain distance from each other, the air which is discharged by two adjacent fan wheels in opposing directions, is deflected automatically and flows preferably above and below the sieve drums out of the fan chamber and back into the treatment chamber.

In order to increase especially the treatment capacity, it is desirable to install as great as possible a fan capacity. In order to increase the fan capacity, i.e., in order to make it possible to install larger fans, it has already been suggested to arrange large fan wheels which extend beyond the drum diameter alternately at one and the other end face of the sieve drums. This, however, incorporates the disadvantage that one fan chamber each must be provided at both sides of the sieve drums. This, on the one hand, renders access to the treatment chamber essentially more difficult, and, on the other hand, the device becomes wider than is desired. However, every attempt must be made to keep the devices as small, and thus also as narrow, as possible.

In order to ensure access to the treatment chamber and in order to make necessary only one fan chamber, the fans which are arranged at the end faces of the sieve drums are staggered in the direction to the sieve drum axis, in order to make it possible that the fan housings of the two fans engage one over the other in another known device. With this arrangement it is possible to provide fans which are larger than the drum diameter. This arrangement is suitable for fans with one-way air discharge where the current of treatment medium of one fan is completely separated from the current discharged by the adjacent fan. With those devices, it is, however, disadvantageous that the fan chamber must be relatively wide, and that thus also the device becomes wider than is desired.

The present invention has the object to increase and/or to enlarge the power of the suction draft of each sieve drum without enlarging the device. When using high-capacity fans, the suction draft can only be increased by enlarging the fans, when operating the fans most economically, since each fan operates most efficiently only within a certain speed range.

The object of the present invention is realized in a simple way with a device of the kind described hereinabove by arranging the fan wheels of at least some sieve drums ecentrically to the appertaining sieve drums in order to produce powerful suction drafts. By the eccentric arrangement of the fans it is now possible to provide essentially larger fans, i.e. fan wheels, since now, for the use of the fans, no longer the distance between two adjacent sieve drum axes is decisive but instead the distance between the two fan axes. That distance, however, may be essentially larger than the distance between two sieve drum axes.

For example, in the case of drying and heat-setting, an extremely powerful suction draft is only required with the first few sieve drums, i.e., with the sieve drums arranged at the intake, whereas essentially less powerful suction drafts suffice for holding and further drying the already pre-dried material, or in the case of heat-setting, the material which has already been heated to the setting temperature. This can be simply taken into account by providing the sieve drums located at the intake of the device with more efficient fan wheels, i.e. by arranging only the fan wheels of those sieve drums eccentrically to the appertaining sieve drums.

In general, the material to be treated is held onto and guided along the lower portion of one sieve drum and along the upper portion of the next sieve drum. For holding the material to the lower portion of the sieve drum, naturally a more powerful suction draft is required than for the sieve drums which hold and guide the material on the upper portion. In the case of treatment devices for drying, steaming and setting, the sieve drums which hold the material onto their lower portion may, therefore, be provided with a more powerful suction draft, i.e. with more efficient fans than the drums which guide the material along their upper portion. This fact can be simply considered by arranging—as seen in the direction of material passage—each second fan eccentrically to the appertaining sieve drum, that means preferably that fan which is correlated to the sieve drums which guide the material along their lower portion.

When adhering to the conventional sieve drum design with rotating sieve drum bottoms which are rigidly connected with the sieve drum jacket, the exhaust opening can only be arranged concentrically, as it is usual up to now. In order to make it possible to arrange the fans eccentrically to the sieve drums, it is suggested in a further embodiment of the present invention to provide an oblique exhaust socket between the fan and the exhaust opening of the sieve drum. That exhaust socket may, in general, be relatively short. Neither need it be essentially wider than the usual exhaust sockets which are arranged between sieve drum and fan wheel.

Another possibility is to provide the sieve drum, which is equipped with eccentrically arranged radial fan wheels, on the fan side thereof with a bottom which is stationary and separate from the sieve drum jacket. The sieve drum jacket may, as usually, be mounted on a shaft or it may be supported by the stationary bottom, preferably by way of roller bearings. In the case of materials which are permeable to the treatment medium, it is of advantage to seal the stationary sieve drum bottom to the sieve drum jacket. For example, the sealing can be effected by means of a circumferential joint which is fastened to the sieve drum bottom. However, the circumferential joint may as well be fastened to the sieve drum jacket and rotate together with the sieve drum. In the case of materials which are impermeable or slightly permeable to the treatment medium, it is of advantage to leave the distance caused by the mounting between sieve drum bottom and sieve drum jacket free, in order to make it possible to suck off the treatment air laterally through that free space. Possibly also openings in the stationary sieve drum bottom may be provided in a known way in order to improve the lateral sucking off of the treatment medium in the case of slightly permeable materials.

With a stationary sieve drum bottom it is possible in a simple way to provide an eccentric exhaust opening in that bottom which opening is preferably directly correlated to the exhaust socket of the radial fan wheel. However, also in case of a great eccentricity of a fan wheel to the sieve drum, an oblique exhaust socket may be connected therebetween.

In another embodiment of the present invention, the sieve drums with eccentrically arranged fan wheels are not provided with a bottom on the fan side and preferably they are sealed to the partition wall which separates the fan chamber from the treatment chamber. Also in this case, the sieve drums may, in a known way, be mounted on a shaft or they may be supported directly by the wall between the treatment chamber and the fan chamber, i.e. the bearings are directly fastened to the wall in that case. Openings are provided in that wall which are correlated to the exhaust sockets of the fan wheels.

These and other objects, features and advantages of the present invention will become more obvious from the following description when taken in connection with the accompanying drawing which shows, for purposes of illustration only, several embodiments in accordance with the present invention, and wherein:

FIGURE 3 is a transverse cross sectional view of the device according to FIGURE 1;

FIGURE 4 is a transverse cross sectional view of still another device according to the present invention;

FIGURE 5 is a partial cross sectional view, on an enlarged scale, illustrating a bearing of the sieve drum of the device according to FIGURE 4; and FIGURE 6 is a partial cross sectional view, similar to FIGURE 5, of another bearing of the sieve drum.

Figure 1:
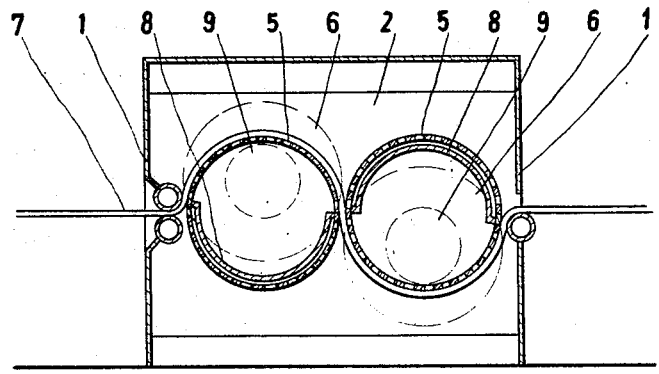
FIGURE 1 is a longitudinal cross sectional view of one embodiment of the treatment chamber of a device according to the present invention with sieve drums subjected to a suction draft.
Figure 2:
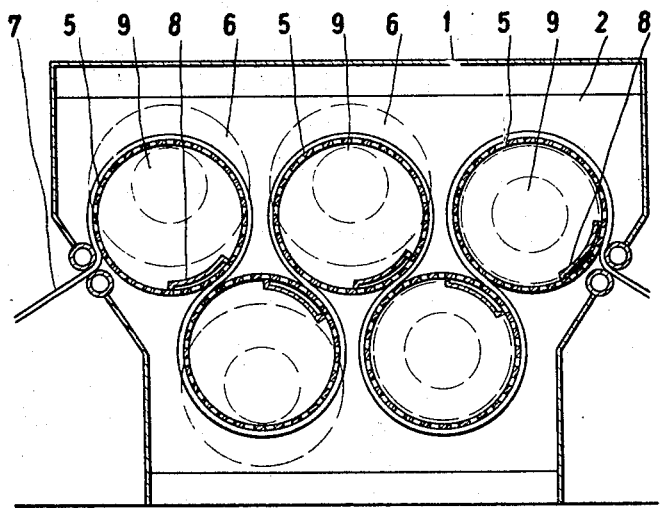
FIGURE 2 is a longitudinal sectional view of the treatment chamber of another device according to the present invention.

Referring now to the drawing wherein like reference numerals are used throughout the various views to designated like parts, the devices shown are provided with a heat-insulated housing 1, the interior of which is subdivided into a fan chamber 3 and a treatment chamber 4 by means of a partition wall 2. The sieve drums 5 subjected to a suction draft are arranged in a treatment chamber 4 either in line (FIGURE 1) or the sieve drums 5 are arranged in two rows (FIGURE 2) whereby the sieve drums of the one row are staggered to the sieve drums of the other row. In the case of the latter arrangement of sieve drums 5, the material to be treated 7 is passed from a sieve drum 5 of one row to an adjacent sieve drum 5 of the other row and is held onto and guided along those sieve drums by the suction draft. The suction draft in sieve drums 5 is produced by fans 6 which are arranged at the end faces of the sieve drums within a fan chamber 3.

As is well known, the fan capacity increases with increasing diameter of the fan wheels. In order to make it possible to accommodate fan wheels 6 which are as large as possible, at least with the sieve drums which are arranged at the intake of the device, the fan wheels are not arranged concentrically or coaxially to the sieve drums, as was usual up to now, but they are correlated to the sieve drums eccentrically. Thus it is possible to provide essentially larger fan wheels and to produce an essentially more powerful suction draft on the sieve drums. The suction draft, in turn causes essentially larger air quantities to be sucked through the material which thus is dried or treated in another suitable way much more quickly.

In order to effect an automatic passage of the material from one sieve drum 5 to the adjacent one, baffle plates 8 are provided in the sieve drums, which baffle plates are at least arranged at the points of material passage.

Sieve drum 5 may be provided, in a known way, with a concentric exhaust opening 9 (FIGURE 3). In the case of the latter design of the sieve drums 5 an oblique exhaust socket 10 is provided between a sieve drum 5, and an eccentrically arranged fan 6.

Another embodiment of the present invention is shown in FIGURE 4. In this embodiment, an exhaust opening 9 is arranged eccentrically to the sieve drum 5. This is only possible, if either a stationary drum bottom 11 is provided, or if a sieve drum 5 is directly supported by a partition wall 2 on that side. The mounting details of a sieve drum 5 directly on a partition wall 2 is shown in FIGURE 5. The mounting details of a sieve drum 5 on a stationary drum bottom 11 may be gathered from FIGURE 6.

In the embodiment according to FIGURE 5, a ring 12 extending into the drum 5 is fastened to a partition wall 2. In the embodiment according to FIGURE 6 a ring 12 is fastened to a stationary drum bottom 11. Several roller bearings 13 are arranged on the ring 12, spaced along the circumference on which rests and rolls off the drum 5. For a better sealing between sieve drum 5 and ring 12, an elastic sealing ring 14 is fastened to ring 12 which is preferably made of metal.

Sieve drums 5 and fan wheels 6 are connected in a known way with a suitable drive 15 of conventional construction.

In the embodiments according to FIGURES 4, 5 and 6, an exhaust socket between sieve drum 5 and fan wheel 6 is not required. In those embodiments an exhaust socket 16 of a fan wheel 6 may be directly correlated to an exhaust opening 9.

While I have shown and described several embodiments in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A device for the treatment such as drying, steaming, setting, washing and the like, of materials of all kinds, preferably of textile material, comprising sieve drum means subjected to a suction draft and arranged closely side by side as conveying elements, and fan wheel means arranged at least at one end face of the sieve drum means and operatively connected therewith for the creation of a powerful suction draft, the fan wheel means of at least some of the sieve drum means being arranged eccentrically to the appertaining sieve drums.

2. A device according to claim 1, wherein the fan wheel means are radial fan wheel means.

3. A device according to claim 1, in which the fan wheel means of the sieve drum means arranged at the intake of the device are arranged eccentrically to the appertaining sieve drum means.

4. A device according to claim 1, in which, as seen in the direction of material passage, each second fan wheel means is arranged eccentrically to the appertaining sieve drum means.

5. A device according to claim 1, in which the sieve drum means are provided on the fan side thereof with a substantially concentric exhaust opening, and further comprising oblique exhaust socket means between a respective fan wheel means and the corresponding exhaust opening of the sieve drum means.

6. A device according to claim 5, in which the fan wheel means of the sieve drum means arranged at the intake of the device are arranged eccentrically to the appertaining sieve drum means.

7. A device according to claim 5, in which, as seen in the direction of material passage, each second fan wheel means is arranged eccentrically to the appertaining sieve drum means.

8. A device according to claim 1, in which stationary bottoms are provided on the fan sides of the sieve drum means having eccentrically ararnged fan wheel means, said stationary bottoms being separate from the sieve drum jacket of a corresponding sieve drum means.

9. A device according to claim 8, in which the sieve drum jacket is supported by the stationary sieve drum bottom on the fan side of the sieve drum means.

10. A device according to claim 8, further comprising seal means for sealing a stationary sieve drum bottom to the corresponding sieve drum jacket.

11. A device according to claim 10, in which a stationary sieve drum bottom is provided with an eccentric exhaust opening.

12. A device according to claim 11, in which the eccentric exhaust opening is directly correlated to the exhaust socket of the corresponding fan wheel means.

13. A device according to claim 8, further comprising seal means for sealing a stationary sieve drum bottom to the corresponding sieve drum jacket.

14. A device according to claim 8, in which a stationary sieve drum bottom is provided with an eccentric exhaust opening.

15. A device according to claim 14, in which the eccentric exhaust opening is directly correlated to the exhaust socket of the corresponding fan wheel means.

16. A device for the treatment such as drying, steaming, setting, washing and the like, of materials of all kinds, preferably of textile material, comprising housing means including partition wall means forming a treatment chamber and a fan chamber, sieve drum means subjected to a suction draft and arranged within the treatment chamber of said housing means closely side by side as conveying elements, fan wheel means arranged in said fan chamber at least at one end face of the sieve drum means and operatively connected therewith for the creation of a powerful suction draft, the fan wheel means of at least some of the sieve drum means being arranged eccentrically to the appertaining sieve drum means, and means for sealing the sieve drum means to the partition wall means.

17. A device according to claim 16, wherein the fan wheel means are radial fan wheel means.

18. A device according to claim 16, in which the sieve drum means having eccentrically arranged radial fan wheel means are supported by the partition wall means between treatment chamber and fan chamber.

19. A device according to claim 16, in which the fan wheel means of the sieve drum means arranged at the intake of the device are arranged eccentrically to the appertaining sieve drum means.

20. A device according to claim 16, in which, as seen in the direction of material passage, each second fan wheel means is arranged eccentrically to the appertaining sieve drum means.

References Cited

UNITED STATES PATENTS

| | | | |
|---|---|---|---|
| 2,301,249 | 11/1942 | Butterworth et al. | 34—115 XR |
| 3,196,555 | 7/1965 | Friedel et al. | 34—115 |

FREDERICK L. MATTESON, JR., *Primary Examiner.*

A. D. HERRMANN, *Assistant Examiner.*